United States Patent
Delwood et al.

(10) Patent No.: US 10,146,661 B2
(45) Date of Patent: Dec. 4, 2018

(54) MEMORY DEBUGGING TOOL FOR DISPLAYING OBJECTS WITHIN A NAVIGABLE GRAPH

(71) Applicants: Daniel M. Delwood, San Jose, CA (US); David V. Payne, Los Altos Hills, CA (US)

(72) Inventors: Daniel M. Delwood, San Jose, CA (US); David V. Payne, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 15/179,948

(22) Filed: Jun. 10, 2016

(65) Prior Publication Data

US 2017/0357566 A1    Dec. 14, 2017

(51) Int. Cl.
| | |
|---|---|
| *G06F 11/00* | (2006.01) |
| *G06F 11/36* | (2006.01) |
| *G06F 3/0482* | (2013.01) |
| *G06F 3/0484* | (2013.01) |
| *G06F 11/32* | (2006.01) |

(52) U.S. Cl.
CPC ........ *G06F 11/3624* (2013.01); *G06F 3/0482* (2013.01); *G06F 3/0484* (2013.01); *G06F 11/323* (2013.01); *G06F 11/3664* (2013.01)

(58) Field of Classification Search
CPC .... G06F 3/00482; G06F 3/04842; G06F 8/34; G06F 11/3664; G06F 11/3624; G06F 11/323
See application file for complete search history.

(56) References Cited

U.S. PATENT DOCUMENTS

| | | | |
|---|---|---|---|
| 5,740,440 A * | 4/1998 | West | G06F 8/24 714/E11.217 |
| 6,167,535 A * | 12/2000 | Foote | G06F 11/3636 714/38.11 |
| 6,996,806 B2 | 2/2006 | Bates et al. | |
| 8,780,114 B1 | 7/2014 | Jackey et al. | |
| 2008/0162547 A1* | 7/2008 | Bonev | G06F 11/3495 |
| 2011/0154236 A1* | 6/2011 | Stoeck | G06F 17/30 715/771 |

(Continued)

OTHER PUBLICATIONS

L. Cartey, "Representing Memory Graphs Interactive debugging using the Eclipse Framework", St. Catherine's College, May 14, 2008, 43 pages.

(Continued)

*Primary Examiner* — Marc Duncan
(74) *Attorney, Agent, or Firm* — Womble Bond Dickinson (US) LLP (57) ABSTRACT

Described is a tool for allowing developers to analyze objects in to process virtual address space. The system includes a technique for identifying references between objects within memory and refining these references with runtime metadata and analysis heuristics. These objects may then be displayed in the form of a graph that employs a progressive disclosure to more effectively allow a developer debug memory. For example, the graph may organize objects within a coordinate grid system that allows a developer to concentrate or expand reference paths as necessary when analyzing objects or detecting potentially leaked or abandoned sources of memory.

20 Claims, 9 Drawing Sheets

(56) References Cited

U.S. PATENT DOCUMENTS

| | | | | |
|---|---|---|---|---|
| 2011/0307828 A1* | 12/2011 | Chilimbi | ............... | G06F 11/323 715/802 |
| 2013/0054925 A1* | 2/2013 | Hsia | .................... | G06F 11/3604 711/170 |
| 2015/0212928 A1* | 7/2015 | Gounares | ............ | G06F 11/3664 717/125 |
| 2017/0109933 A1* | 4/2017 | Voorhees | ............ | G06F 17/2241 |

OTHER PUBLICATIONS

T. Zimmerman and A. Zeller, "Visualizing Memory Graphs", Universitat Passau, May 20, 2001, 12 pages.

* cited by examiner

MEMORY DEBUGGING TOOL FOR DISPLAYING OBJECTS WITHIN A NAVIGABLE GRAPH

TECHNICAL FIELD

This disclosure relates generally to the field of memory debugging. More specifically, this disclosure relates to identifying objects within a virtual memory space and providing a navigable user interface for inspecting the identified objects.

BACKGROUND

Generally, a memory leak relates to the gradual loss of available memory when an application (or part of an operating system) repeatedly fails to return memory that it has obtained for temporary use. For example, a memory leak may result when a block of dynamic memory cannot be released by a running application because the reference pointers to the memory block are absent. As a result, repeated generations of leaked memory can cause an application to run out of memory or cease functioning altogether. Although developers are cognizant of memory management when developing applications, the increased performance capabilities of modern devices often mask the effects of inefficient memory usage. However, for an application that is open frequently or runs continuously, even a slight memory leak may diminish the performance of a device by reducing the available amount of memory. For example, these slight memory leaks when aggregated may affect performance in environments where multiple applications from third-party applications are running on the device as a background process.

Although the deleterious effects of memory leaks are well known, memory leaks are not that uncommon, especially in environments that use programming languages without built in automatic garbage collection. Accordingly, a number of memory debugging or memory profiling tools have been developed to aid with the process of analyzing memory usage. These tools, however, are often tedious to use, and accordingly, not always developer friendly. For example, these tools often require a developer to analyze countless lines of text or manage complicated relationship representations. Moreover, such tools are not easily scalable in production environments where memory sizes may be in the order of gigabytes. Thus, it is often the case that current memory debugging tools are not always utilized by developers, and accordingly, developed applications may suffer from memory management inefficiencies that may otherwise be preventable.

SUMMARY

The disclosure describes systems and techniques for providing an efficient way for developers (or users) to analyze objects in a memory. In one embodiment, described is a system for providing a navigable user interface that allows a developer to inspect objects in one or more segments of memory. The user interface may display the objects in the form of a graph and may employ progressive disclosure to more effectively allow a developer to debug memory. For example, the graph may organize objects within a coordinate grid system that allows a developer to concentrate or expand reference paths as necessary when analyzing objects or detecting potentially leaked or abandoned sources of memory. Accordingly, the graph may provide information even in instances where displaying an entire graph of objects and their relationships would be prohibitively complex and unintelligible In another embodiment, described is a system for identifying references between objects within the memory. The system may further analyze the objects identified and annotate blocks of memory to allow the system to refine the set of objects when displaying them as part of a memory graph. The objects may also be analyzed with respect to various operating systems. For example, the operating system of the development environment may differ from the target operating system of the application (or program) being developed. Accordingly, in one embodiment, this additional processing includes serializing and deserializing objects for another operating system. Accordingly, the additional processing may allow the system to provide potentially more relevant memory debugging results.

In addition, some embodiments may be incorporated into a native development environment to allow developers a more convenient, and thus more likely to be used, tool for memory debugging. By increasing the adoption of this memory debugging tool, more robust development results may be achieved, which is turn may provide an improved user experience for an application across a suite of devices.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Described herein is a memory debugging tool for displaying objects within a memory as a navigable graph. Unlike previous attempts at providing a visual display of memory objects, some embodiments herein, display information in a readable manner as opposed to a mere "dump" of a memory file. For example, some embodiments describe refining this list of objects and displaying the objects using a progressive disclosure technique. As described, earlier attempts at providing a visualization of memory often provided a data dump of a memory file displayed in a hierarchy. In such systems, once a particular objected was selected, the hierarchy would expand to reveal children of a parent node, but the hierarchy would dramatically expand only after a few object selections. Thus, the visualization would often require cumbersome scrolling and/or navigating actions to traverse only short depths of information. In contrast, described herein are techniques for displaying objects in a more meaningful arrangement. For example, in order to display objects in an organized manner, the system may not only utilize a progressive disclosure technique, but may also "force" objects to a coordinate grid system. Thus, according to some embodiments of the disclosure, the combination of refinement and progressive disclosure, provide a powerful mechanism for developers to inspect memory objects.

Figure 1:
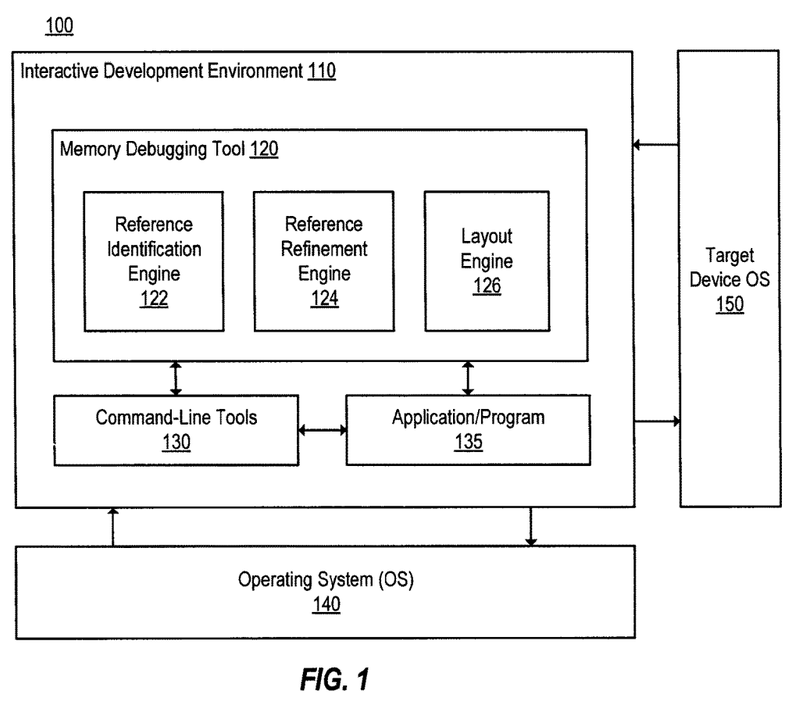
FIG. 1 is a block diagram illustrating an example operating environment according an embodiment of the disclosure.

FIG. 1 is a block diagram illustrating an example operating environment according an embodiment of the disclosure. In one embodiment, a development device (or device or system) may include one or more components of the operating environment 100. The operating environment 100 may include an interactive development environment (IDE) 110 and a memory debugging tool 120. The IDE 110 may contain a suite of software development tools for creating an application/program 135 to be used on one or more target operating systems 150. The memory debugging tool 120 may be separate tool, or may be part of, or work in conjunction with, the IDE 110 (e.g. as built-in or add-on tool). The memory debugging tool 120 may also include one or more components (or modules or engines) for performing processes described herein. As shown, these components may include a reference identification engine 122, a reference refinement engine 124, and a layout engine 126. For example, the reference identification engine 122 may perform operations to identify objects with a memory, and the reference refinement engine 124 may perform operations to refine the list of identified objects. The layout engine 124 may perform operations to display a memory graph, including determining the positioning of objects (e.g. coordinate values for objects within a grid), other calculations such as determining a size of the grid to provide a progressive disclosure, and other functions such as filtering objects. The IDE 110 may also include command-line tools 130 that may be used when debugging the application/program 135. For example, the command-line tools 130 may include, for example, commands for tracing pointers. These tools (or commands, or programs) may be used in conjunction with one or more embodiments of the disclosure to obtain information used for providing a memory graph.

Figure 2:
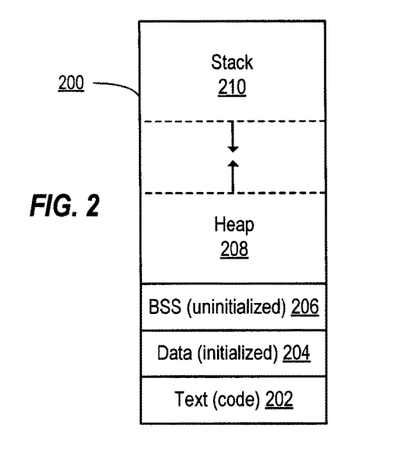
FIG. 2 is a block diagram illustrating an example organization of memory of a device according an embodiment of the disclosure.

FIG. 2 is a block diagram illustrating an example organization of memory of a device according an embodiment of the disclosure. As shown, the memory 200 may be divided into several segments (or regions). A text (or code) segment 202 may store executable instructions of an application. For example, when an application commences, a compiler may set aside memory for the code and the compiled assembly may reside in the text segment 202. A data (or initiated data) segment 204 may contain global variables and static variables that are initialized by the developer. This segment may also be further classified into initialized read-only area and initialized read-write area. The BSS (e.g. block started by symbol/block storage segment) or uninitiated segment 206 may include uninitiated data. For example, data in this segment may include data that is initialized by the kernel to an arithmetic 0 before the application begins executing. For instance, in C, statically-allocated variables without an explicit initializer may be initialized to zero or a null pointer. The stack segment 201 may store local variables along with information that is saved for a procedure or function. Stack memory is typically allocated and deallocated automatically in contrast to heap memory.

The heap (or dynamic memory) segment 208 is an alternative to stack memory, and typically includes dynamic allocations of memory. For example, a developer may explicitly request the allocation of a memory block of a particular size, and the block continues to be allocated until the programmer explicitly requests that it be deallocated. In other words, allocations are not managed automatically like a stack. Accordingly, a developer has greater control of memory resources, but with the added responsibility of actively managing the resources. When an allocation is requested, an area of the requested size may be reserved in the heap and a pointer to that new block is returned. Accordingly, as described herein, these pointers must be accounted for. Typically, when the application is finished using a block of memory, it makes an explicit deallocation request to indicate to the heap manager that the block is no longer needed. Some programming languages add a layer of abstraction on top of the manual allocation and deallocation of memory, migrating the developer's responsibility to managing those abstractions (e.g. managing reference counts or variable annotations). However, as described herein, memory may become abandoned or leaked if the block of memory (e.g. block of memory corresponding to an object) is not appropriately deallocated. For example, leaked memory relates to memory that has no references to the allocation from any object in the object graph associated with the application. In other words, as further described herein, the memory is unreachable (or untraceable). Another memory issue that may occur is the occurrence of retained cycles. For example, when two objects only reference each other, this may create a retained cycle (and a leak). As described, these memory issues may have deleterious effects on application functions.

To overcome issues with deallocation of memory, certain programming languages (e.g. Objective-C and Swift) may employ Automatic Reference Counting (ARC), which is a memory management enhancement where the burden of keeping track of an object's reference count is lifted from the programmer to the compiler. In traditional Objective-C, the programmer would typically send retain and release messages to objects in order to mark objects for deallocation or to prevent deallocation. Under ARC, the compiler may do this automatically by examining the source code and then adding retain and release messages in the compiled code. However, even with ARC, visualizing and accounting for references becomes tedious. Accordingly, the debugging tool described herein provides a visualization in the form of a navigable graph and may allow developers to identify and address memory issues described above.

Figure 3:
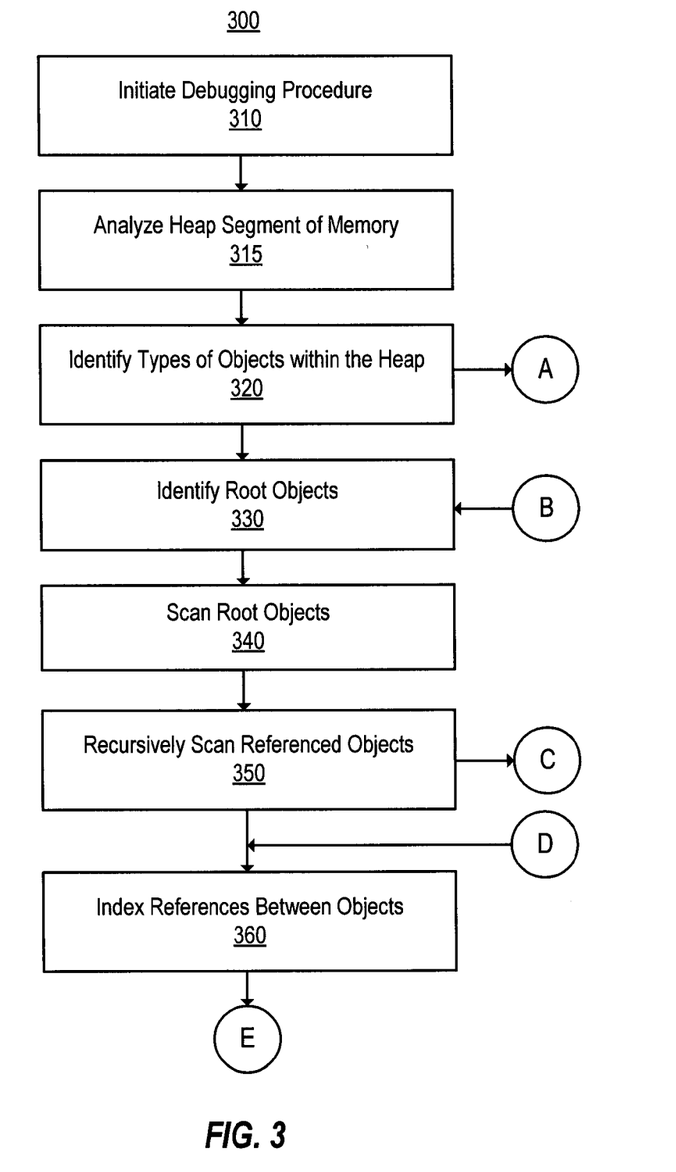
FIG. 3 is a flow diagram illustrating a process of identifying objects within a memory according to an embodiment of the disclosure.

FIG. 3 is a flow diagram illustrating a process of identifying objects within memory according to an embodiment of the disclosure. The system (or development device) may perform process 300, for example, within the IDE 110. In order to begin a memory debugging process, the system may initiate a debugging procedure 310. For example, the system may initiate debugging of an application (e.g. application/program 135) being developed within the IDE 110. In order to identify objects for a debugging process, in 315, the system may analyze one or more segments of the memory (e.g. memory 200). For example, the analysis may include scanning memory blocks of the heap segment (e.g. heap segment 208). Once acquiring the relevant blocks of memory, the system may identify types of objects within the memory in 320. In one embodiment, the system may perform further operations (or sub-processes) to further process the information within the memory as shown in FIG. 4.

Figure 4:
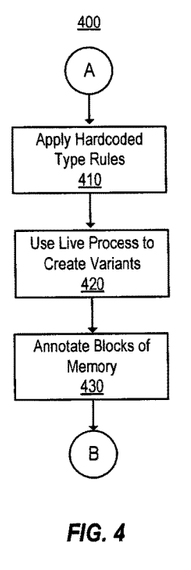
FIG. 4 is a flow diagram illustrating a process of identifying types of objects within a memory according to an embodiment of the disclosure.

FIG. 4 is a flow diagram illustrating a process of identifying types of objects within the memory according to an embodiment of the disclosure. The further processing may include applying hardcoded type rules to the objects in memory in 410. In 420, the process may use a live process to create variants of the memory objects. Accordingly, based on the operations performed in 410 and 420, the process may now annotate blocks of memory in 430. These annotations may be used in the processing of the objects, for example, during a refinement process as further described herein.

Returning to FIG. 3, after identifying types of objects within the memory, or after performing the additional processing of FIG. 4, the system may identify, amongst the objects already identified, particular objects as root objects in 330. For example, the root objects may include objects such as stacks, global variables, registers of threads, virtual memory regions, object maps, etc. Once one or more root objects are identified, the system may scan the root objects in 340 to identify a set of objects, for example, the heap that reference to, or are referenced by, the root object. For example, a reference to an object may include a pointer to another object as described. To identify a chain of additional objects that reference to, or are referenced by, at least one object of the set of objects, the process may recursively scan the identified objects in 350. This process may continue so that all allocated blocks of a memory manager list are examined (e.g. all regions of the memory). In one embodiment, the system may also perform a cycle analysis to identify additional blocks of memory that may not be referenced, but associated with the application. Accordingly, in one embodiment, the process may identify all the objects associated with the application. After identifying the chains of additional objects, the process may perform another sub-process (or further operations) as shown in FIG. 5.

Figure 5:
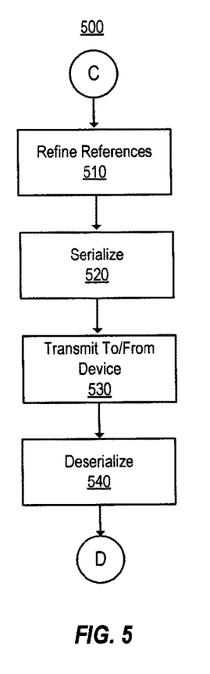
FIG. 5 is a flow diagram illustrating a process of refining the references between objects according to an embodiment of the disclosure.

FIG. 5 is a flow diagram illustrating a process of refining the references between objects according to an embodiment of the disclosure. This further processing may include refining the list of identified objects in 510. In one embodiment, the refinement may be based at least partially on the annotations associated with one or more blocks of the memory. In addition, certain objects of memory may be analyzed with respect to various operating systems. For example, development of an application may occur on a device with a first operating system, while the application being developed may be intended to run on a device with a second, different, operating system. Accordingly, the process may perform a simulation for one or more objects on the intended operating system. This may include serializing an object in 520, and transmitting the object to an intended target device in 530. In 540, the object may be deserialized and transmitted back to the operating system of the development device. In one embodiment, the serializing/deserializing process may occur by actually transmitting the object to a second device. In another embodiment, the serializing/deserializing may occur by simulation, for example, by transmitting the object to virtual operating system or performing another form of simulation of a different operating system.

Returning once again to FIG. 3, once the objects have been identified and refined, the process may index the references between objects in 360. When creating the index various tables or data structures may be used. For example, a graph abstract data type may be created in any suitable manner such as with an adjacency list, an adjacency matrix, incidence matrix, or any other suitable data structure. This index may be referred to when creating a memory graph as described in FIG. 6.

Figure 6:
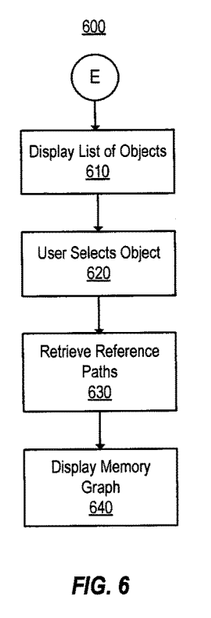
FIG. 6 is a flow diagram illustrating a process for displaying objects within a memory graph according to an embodiment of the disclosure.

FIG. 6 is a flow diagram illustrating a process for displaying objects within a memory graph according to an embodiment of the disclosure. The process may start by displaying a list of objects within an interface in 610. Once a list of objects are displayed on the interface, a user may select an object in 620, and in response, the process may retrieve reference paths for the selected object in 630. The reference paths may be retrieved from the index created as described above (e.g. operation 360), from one or more command-line tools (e.g. command-line tools 13), or a combination thereof. Once the reference paths have been retrieved, they may be displayed as memory graph in 640. Embodiment may incorporate pragmatic features to provide an efficient display of the memory graph. For example, the system may refine or reduce the number of objects (e.g. prune) the graph as describe above, or may provide the ability to filter objects of the graph as further described herein. In other words, the user interface of one or more embodiments described herein distinguish the system from previous attempts at providing a visual representation of memory objects.

Figure 7:
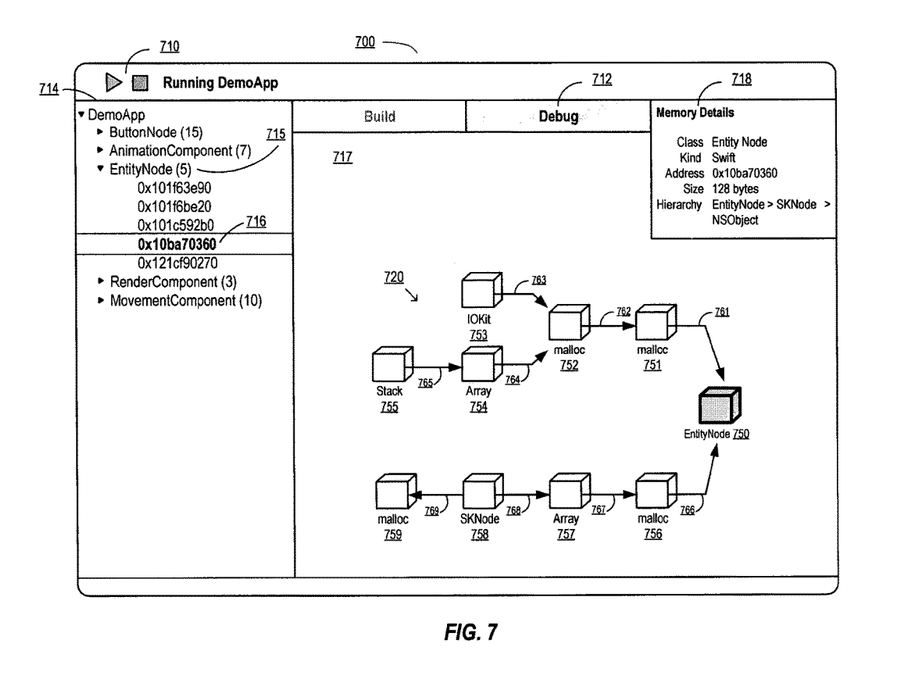
FIG. 7 is an example graphical user interface for displaying a memory graph according to an embodiment of the disclosure.

FIG. 7 is an example graphical user interface for displaying a memory graph according to an embodiment of the disclosure. In one embodiment, the system may display a graphical user interface 700 that may include or be part of an integrated development environment (IDE) interface 710. In one embodiment, the IDE interface 710 may correspond to IDE 110. The IDE interface 710 may be used to design and develop an application and may include various development tools. For example, a debug tool 712 (or option or view) may be provided to employ various embodiments described herein. The debug tool 712 may be accessed during a debugging of an application (e.g. "DemoApp" as shown). When debugging, a developer (e.g. user) may pause or create a breakpoint while running an application or process. Accordingly, objects of one or more segments of memory may be analyzed at such a breakpoint. In one embodiment, the one or more segments of memory may include a heap segment of memory. In addition, embodiments may also provide a comparison of objects and various breakpoints allowing the developer to compare memory profiles at various points during the execution of an application. For example, in one embodiment, multiple navigable memory graphs that correspond to different breakpoints may be concurrently displayed in order for a developer to compare memory profiles.

The system may include as part of the interface various interface elements such as a navigator 714 that lists components of the application, a graph display area 717, and other elements. The navigator 714 may show the components as a hierarchy, for example, starting from the application down to specific objects within the heap. As shown, the navigator 714 may also show heap object counts 715 for a particular component, and each object within a heap may be displayed individually. For example, as shown, heap object 716 may be listed by its corresponding memory address (e.g. 0x010ba70360). The interface may also provide memory details 718 for a particular object. The memory details 718 may include various types of information including, for example, class information, kind of memory object, memory address, size information, hierarchical breakdown, and other forms of information.

The objects listed within the navigator 714 may also be individually selected and inspected by the developer. For example, as shown, a developer may select heap object 716 (e.g. as highlighted), and in response, the interface may display a memory graph 720 within the graph display area 717. As shown, the memory graph 720 provides a visualization of memory contents of a heap and may display the graph with the selected object (e.g. object 716) as the object of interest. Based on the configuration of the graph, a developer may analyze the state of the application. For example, the graph may provide information on the relationship between two objects (e.g. whether there are any pointers pointing to a particular object), the composition of an object or data structure (e.g. the number of elements of a data structure), importance of objects (e.g. sizes of objects), and other types of information. The memory graph 720 may also provide a visualization showing a directional reference path from root objects to an object of interested to allow a developer to determine if a particular object (or memory block) is reachable from the root object (or node). For example, objects that are not reachable from the root object may provide an indication of leaked or abandoned memory.

In this example, memory graph 720 shows an example visualization of references between objects including an object of interest (e.g. object 750 "EntityNode"). As shown, a user may select an object of interest (e.g. object 716) on the navigator 714. References to, and references by, an object (e.g. pointers) are shown as vertices and objects are shown as nodes within the graph. As shown, the graph may simplify the visualization of references by showing only a single reference connection between objects even in instances where there are multiple references connection between objects. For example, the single reference connection shown between objects may be based on the shortest path between objects, or based on other criteria such as relevancy criteria as discussed further herein. As referred to herein, objects (e.g. the selected object) may directly or indirectly reference by other objects. For example, as shown here, selected object 750 is directly referenced by objects 751 and 756. Other objects including root objects (e.g. 753, 755, and 758) may indirectly reference the selected object.

In one embodiment, the graph may be in the form of a directed graph, and accordingly, the vertices may include a directional arrow corresponding to whether an object references to, or is referenced by, another object. For example, directional references show that the selected object 750 is directly referenced by object 751 and object 756 (depending on the implementation, the arrows may point in a relative opposite direction). Accordingly, a collection of these references may form a directional reference path from root objects to the selected object 750. In embodiments, the directional reference path may reveal information relevant for the debugging process. For example, as shown, a directional reference path from root object 753 (e.g. "IOKit") to the selected object 750 includes references 753, 752, and 751. Accordingly, this provides an indication that selected object 750 is reachable by the root object 753. In another example, a root object 758 (e.g. "Stack") has a directional reference path to the object of interest that includes references 768, 767, and 766. Thus, the developer may trace references in a visual manner. In addition, the system may also display leaked memory objects. For example, two objects referencing each other may create a retained cycle leading to leaked objects.

Figure 8:
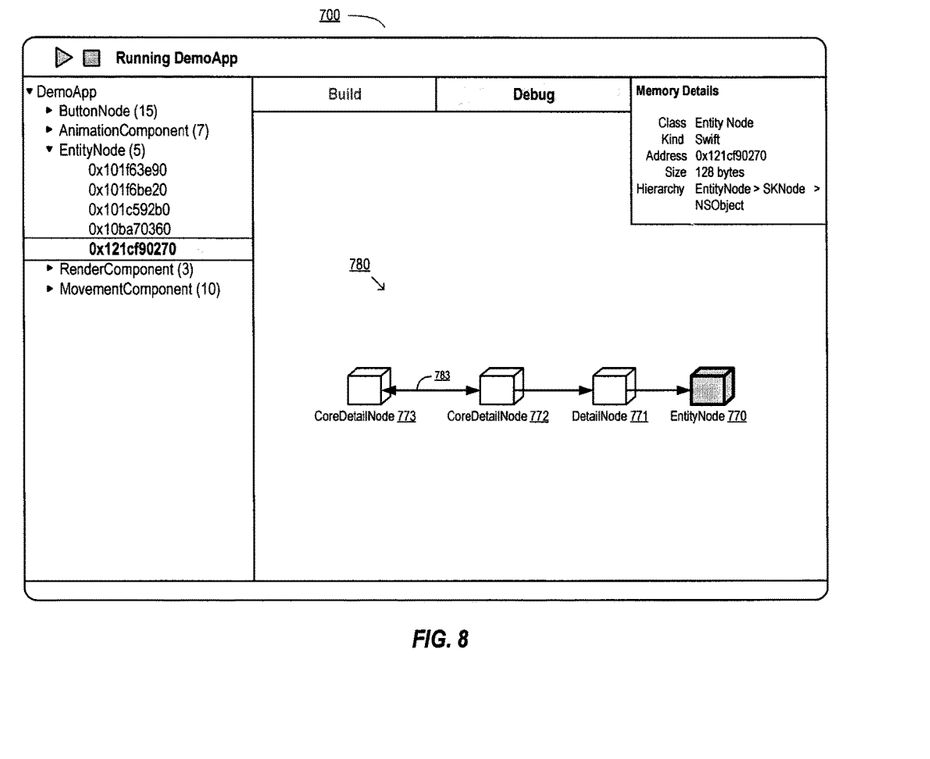
FIG. 8 is an example of a graphical user interface showing a retain cycle between two objects according to an embodiment of the disclosure.

FIG. 8 is an example of a graphical user interface showing a retain cycle between two objects according to an embodiment of the disclosure. As shown in this example, a different heap object is selected from the navigator (e.g. navigator 714) and a memory graph 780 to the selected object 750 is displayed. This example, shows no root objects (e.g. stacks), and accordingly, the objects may be considered leaked. As shown, the chain of references to the selected object 750 includes objects 771, 772, and 773. The graph shows that the reference connection 783 between objects 772 and 773 includes two references such that objects 772 and 773 are referencing each other. Accordingly, in programming languages with ARC (e.g. Swift) there may be a "retain cycle" preventing those objects, and objects referenced by them, from being "cleaned."

Returning to FIG. 7, the memory graph 720 may be displayed in a progressive manner within the graph display area 717. For example, the graph may reveal subsets of objects of the graph in response to user selections. In order to display objects within the memory graph 720 with a progressive disclosure while still displaying the information in an organized manner, the system may utilize a grid. As described above, earlier attempts at providing a visualization of memory often provided a data dump of memory displayed in a generic hierarchical structure. In contrast, embodiments herein may not only refine which objects are shown, but may also position them in an easy to follow grid structure when being displayed as part of a graph.

Figure 9:
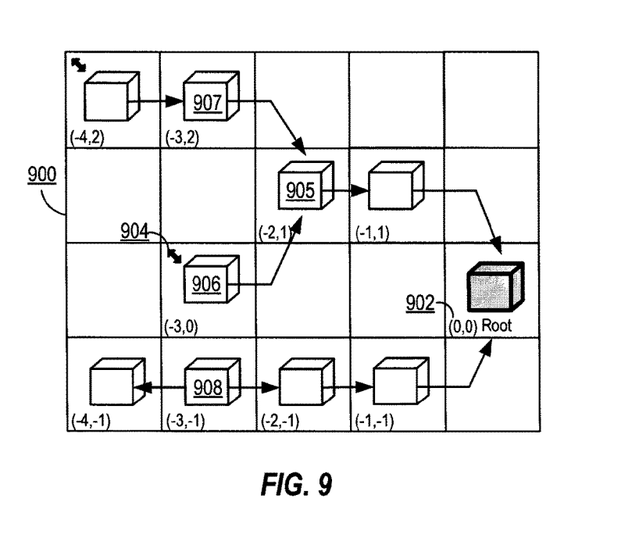
FIG. 9 shows an example grid for displaying a subset of objects of a memory graph according to an embodiment of the disclosure.

FIG. 9 shows an example grid for displaying a subset of objects of a memory graph according to an embodiment of the disclosure. As shown, objects of the graph may be positioned according to units of the grid 900. The grid 900 may be visible or invisible and may be defined using a coordinate system. For example, the position of an object within the grid may correspond to a set of (x, y) coordinate values 902. By utilizing a coordinate grid, the organization (e.g. layout) of objects may be determined and manipulated using various calculations or mathematical techniques. As described, previous attempts at displaying a visualization of memory objects often provided an endless expansion of the hierarchical structure to reveal objects of a hierarchy. In contrast, in one embodiment, the system may predetermine the number of potentially displayable objects and organize the layout of the grid 900 accordingly. For example, the system may determine that a graph has a particular depth to one or more objects (e.g. X number of objects within a chain of references). For instance, as shown in this example, the chain of objects to the selected object includes a depth of 4 objects, and accordingly, the grid 900 may include 5 units (e.g. selected object+depth of 4 objects) as a size of one dimension (e.g. x-dimension as shown). In another example, the system may determine the number of objects that directly reference the selected object, or the number of parent references based on a predetermined number of levels (or degrees of depth). For instance, as shown in this example, the selected objects includes two parent reference objects (e.g. direct references to the root) and object 905 includes two parent reference objects (e.g. objects 906 and 907, at a depth of 3 levels). Accordingly, the grid 900 may include 4 units (2 parent references from the root+2 parent references from object 905) as a size of another dimension (e.g. y-dimension as shown here).

As described, the graph may be displayed in a manner so as to provide a progressive disclosure. Accordingly, the system may progressively disclose one or more subsets of objects. For example, as shown, an expansion indicator 904 may indicate that there is an additional chain of referencing objects pointing to object 906 that are not yet shown. Accordingly, when a developer selects (or clicks) the expansion indicator 904, an additional subset of objects may be progressively revealed.

Figure 10:
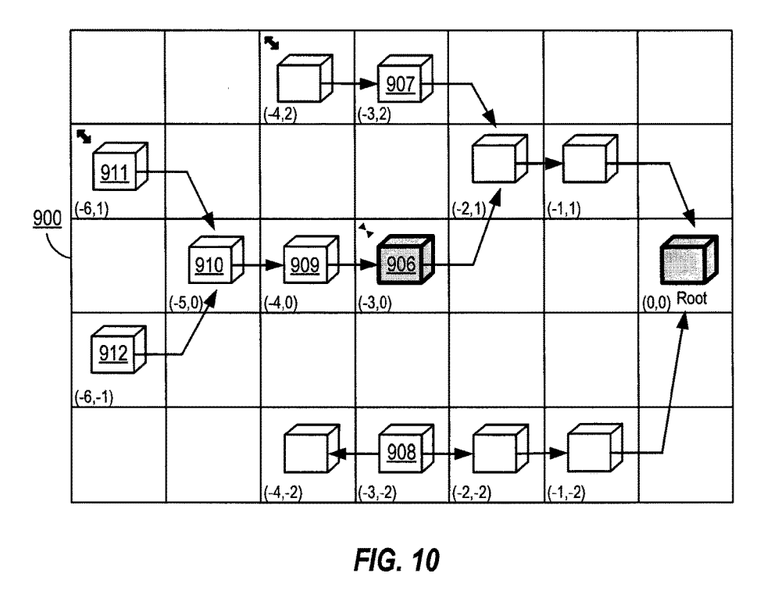
FIG. 10 shows an example grid for displaying an additional subset of objects of a memory graph according to an embodiment of the disclosure.

FIG. 10 shows an example grid for displaying an additional subset of objects of a memory graph according to an embodiment of the disclosure. As shown, in response to progressively disclosing the chain of references to object 906, the additional objects stemming from object 906 (e.g. objects 909-912) that were not previously shown, are organized within additional units of the grid 900. In addition, the system may reorganize and expand the grid 900 to accommodate the progressively disclosed objects (e.g. objects 909-912). For example, objects 907 and 908 are now positioned within different coordinates of the grid 900. Again, this provides the ability for an embodiment to display objects in a well-organized and readable manner for the developer.

In addition, the system, in an embodiment, may reserve space (or units) within the grid 900 in anticipation of a developer selecting particular objects as part of the progressive disclosure. For example, the system may display or calculate grid dimensions based on determining the size of additional subsets of objects. For example, the system may create a grid to initially display only an initial (or first) subset of objects, but may reserve space within the grid to accommodate displaying an additional (or second or subsequent) subset of objects. For example, the set of objects of FIG. 9 may initially be displayed within the grid of FIG. 10, and in such an instance, when objects 909-912 are progressively disclosed, the dimensions of the grid remain constant. Accordingly, additional objects may be displayed without having to scale the size of the grid (e.g. make items of the graph smaller) as the system has already calculated an appropriately sized grid to accommodate displaying the additional objects. In another example, the system may create a grid with dimensions corresponding to only a first subset of objects (e.g. as shown in FIG. 9).

In order to determine an appropriate layout of the grid 900, various intermediate or sub-processes or determinations may be performed. For example, the system may determine which objects to initially show and which objects to hide (e.g. progressively disclose) based on various criteria. For example, the criteria may include the type of object, distance between objects, length of subsequent reference chain, size, type of application, currently selected objects, contextual information, and any other factors.

In another example, the system may calculate a depth of a particular chain of reference objects from a particular object based on the likelihood that the particular object is to be inspected. For example, particular objects may be associated with relevancy criteria as described above. For example, the system may determine that a particular object is likely to be selected based on relevancy criteria, and accordingly, reserves space within the grid according to the developer selecting that object.

In addition, the objects of the graph may be filtered based on one or more criteria. For example, the objects of the graph may be filtered (or at least prioritized) based on the criteria described above. For example, the graph may be filtered based on the type of object. In another example, the objects of the graph may be filtered based on a size (e.g. identify only objects larger than threshold size). Accordingly, this may allow a developer to identify more important or potentially more significant memory bugs.

The graph may also employ a weighting scheme to weight particular objects, separately or in conjunction with the relevancy criteria. For example, objects with a higher weighting value (e.g. more relevant) may be shown initially on the graph, and additional objects with a lower weighting value may be showed as part of a progressive disclosure.

It should be noted that the right to left orientation of objects from the selected object in FIGS. 9 and 10 are merely examples and other configurations such as left to right, top to bottom, bottom to top, etc. may also be used. Similarly, although the coordinates are relative to the selected object (e.g. object with coordinates (0, 0)), other configurations may also be used. Moreover, units do not necessarily have to correspond to a single object, and objects may share a unit, or an object may cover (or split) two or more units. In addition, the graphs are examples, and techniques described herein may be scaled to much larger graphs and grid sizes.

Figure 11:
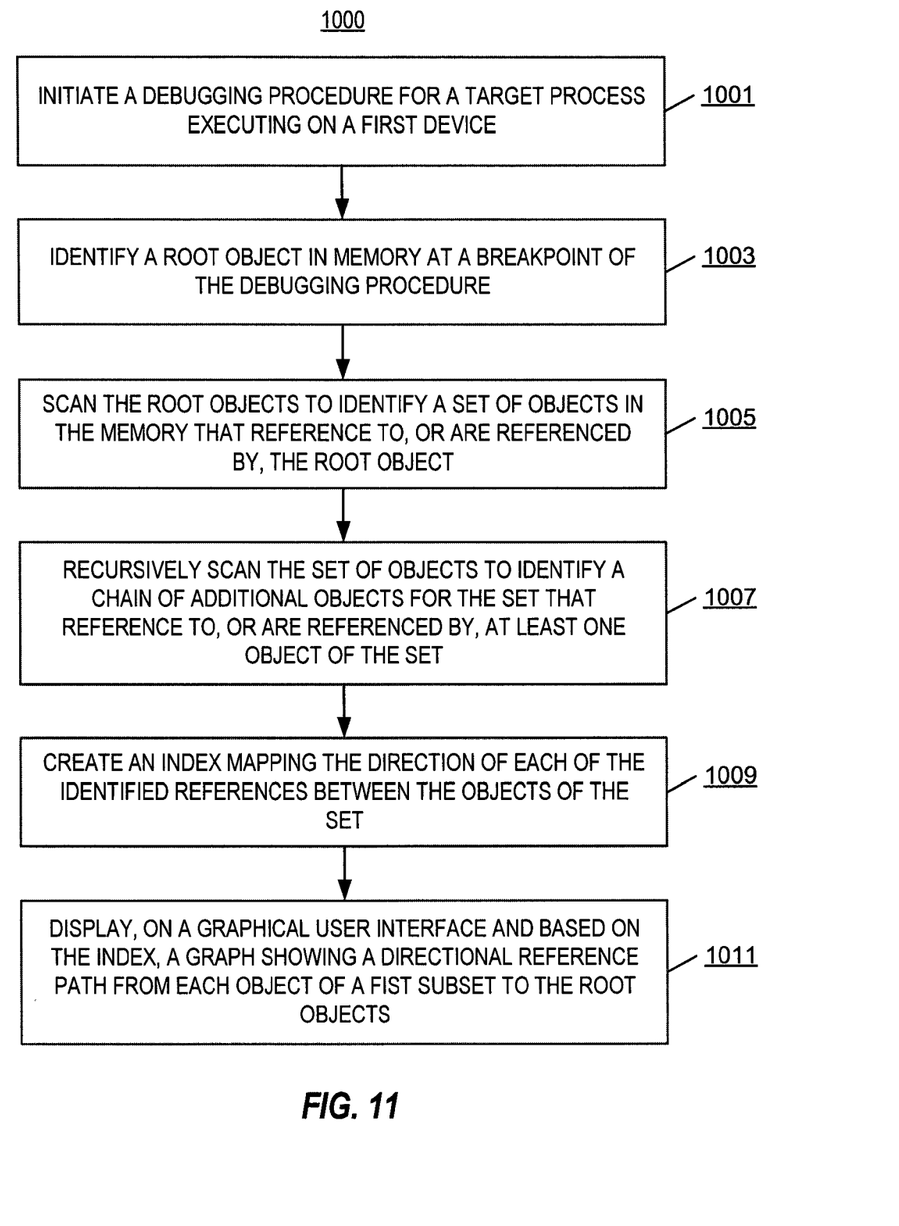
FIG. 11 is a process flow diagram illustrating a method of providing a memory debugging tool according to an embodiment of the disclosure.

FIG. 11 is an example flow diagram illustrating a method of providing a memory debugging tool according to an embodiment of the disclosure. Process 1000 may be performed by a system (e.g. a development device). In operation 1001, the system may initiate a debugging procedure for a target application (application/program 135) executing on a first device. In operation 1003, the system may identify one or more root objects in a memory associated with the target application at a breakpoint of the debugging procedure. For example, one or more segments of the memory may be analyzed such as the heap (e.g. heap 208). In operation 1005, the system may scan the root objects to identify a set of objects in the heap that reference to, or are referenced by, the root objects. In operation 1007, the system may recursively scan the set of objects to identify a chain of additional objects for the set that reference to, or are referenced by, at least one object of the set. In one embodiment, the process may also include identifying the chain of additional objects for the set by applying a set of hardcoded rules to the identified objects. In addition, the process may annotate blocks of memory associated with the identified objects based on the hardcoded rules and a set of live variants of the identified objects. In one embodiment, the process may also refine (or reduce) the identified set of objects in the memory based on simulating processing of one or more objects of the set by a second operating system that is different than the operating system of the first device executing the application. In one embodiment, the refining may include serializing the one or more objects to a second device running the second operating system to perform the simulation.

In operation 1009, the system may create an index mapping a direction of each of the identified references between the objects of the set. In operation 1011, the system may display, on a graphical user interface and based on the index, a graph showing a directional reference path from each object of a first subset of the set to a selected object. For example, the selected object may be object of interest to a user, and accordingly, the user may select to object to analyze a corresponding memory graph (e.g. objects that reference the object). In addition, the graph may be displayed within a two-dimensional coordinate grid and each node may correspond to a set of coordinates. The coordinates may display objects in manner such that the nodes are positioned without crossing references (e.g. as shown in FIGS. 7-10). In one embodiment, the directional reference path of the selected object not being traceable from a root object indicates the selected object is potentially leaked or abandoned. In one embodiment, the system may reveal information on additional subsets of objects. For example, in response to a user selecting an object from the first subset, the system may reveal a directional reference path from each object of a second subset of the set to the selected object. In one embodiment, the process may also include determining a length of a directional reference path within at least of portion of the second subset, and the graph may reserve units within the coordinate grid based on the determined length of the directional reference path.

In one embodiment, the process may provide an additional graph at a second breakpoint to allow a developer the ability to conduct a comparison. For example, the process may also identify one or more root objects in a memory associated with the target application at a second breakpoint. Accordingly, the process may also display, on the graphical user interface and based on a second index created for the second breakpoint, a second graph showing a directional reference path from each object of an initial subset of the set to an object for the second breakpoint. In one embodiment, the second graph may be displayed simultaneously as the first graph.

Figure 12:
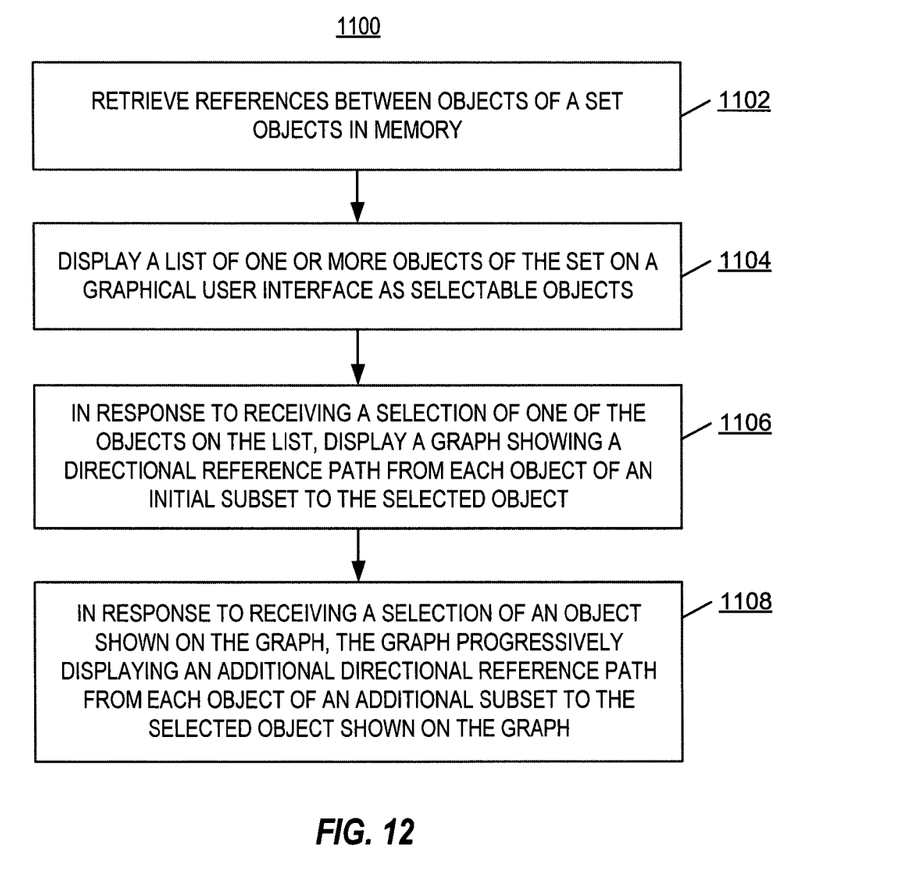
FIG. 12 is a process flow diagram illustrating a method of displaying a memory graph according to an embodiment of the disclosure.

FIG. 12 is an example flow diagram illustrating a method of displaying a memory graph according to an embodiment of the disclosure. Process 1100 may also be performed by the system described above. In operation 1102, the system may retrieve references between objects of a set of objects in one or more segments of memory. For example, the references may be retrieved from a process performed by the memory debugging tool 120, or in conjunction with one or more command-line tools 130. In operation 1104, the system may display a list of one or more objects of the set on a graphical user interface as selectable objects. In operation 1106, the system may display, on the graphical user interface and based on the references retrieved, a graph displaying a directional reference path from each object of an initial subset of the set to the selected object on the list. In one embodiment, the retrieved references may include multiple references between objects and the graph may display only a single directional reference path between objects. For example, the single directional reference path between objects may be a shortest path between objects. The graph may be displayed in response to receiving a selection of one of the objects on the list. In addition, in operation 1108, the system may reveal an additional directional reference path from each object of an additional subset of the set to the selected object shown on the graph. Accordingly, the system may reveal additional portions of the memory graph by progressively displaying objects. The progressive display of additional references paths may occur in response to receiving a selection of an object shown on the graph. In one embodiment, the system may determine the initial subset of the set of objects based on relevancy criteria. For example, the relevancy criteria may include at least one of a type of object, a size of object, a length of chain of additional objects, and a selected filter option.

In addition, in one embodiment, the graph may be displayed within an invisible grid, and each object shown on the graph may be positioned according to an assigned pair of coordinates on the grid. For example, one dimension of the grid may correspond to a length of a longest directional reference path from the initial subset to the selected object, and another dimension of the grid may correspond to a number of child references of the selected object on the list at a predetermined depth of the initial subset of objects. In addition, in one embodiment, the grid may reserve space along one dimension of the grid based on a length of a longest additional directional reference path within at least of portion of the additional subset, and, in one embodiment, a size of the grid does not change in response to the graph progressively displaying the additional directional reference path. Accordingly, the system may determine an appropriate size of the graph to avoid having to scale the graph (e.g. make objects smaller) in order to accommodate the progressive disclosure. In an embodiment, the system may also filter the initial subset of the set of objects based on a set of filtering criteria. For example, the filtering criteria may include a type of object, a size of object, and other criteria.

Figure 13:
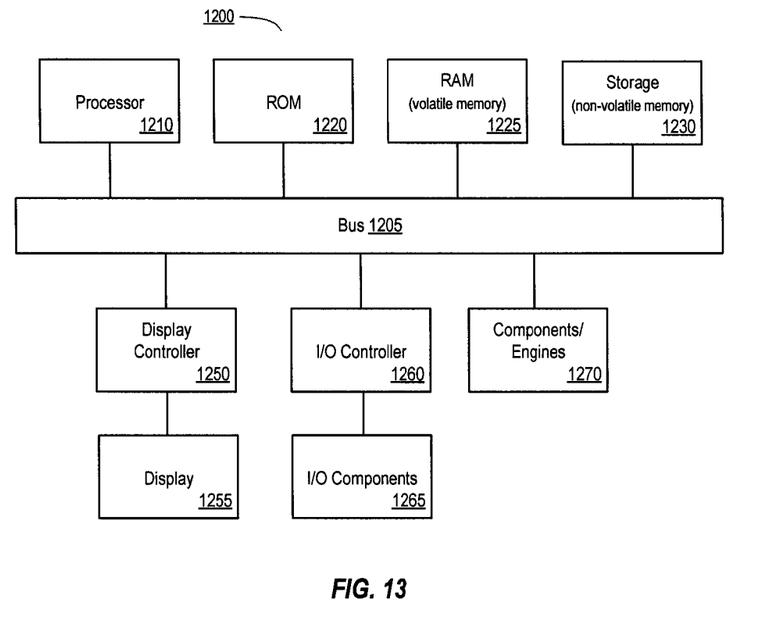
FIG. 13 is a block diagram illustrating an example system which may be used in conjunction with one or more of the embodiments of the disclosure.

FIG. 13 is a block diagram illustrating an example system which may be used in conjunction with one or more of the embodiments of the disclosure. For example, system 1200 (or computing system, or computing device, or device) may represent any of the systems or devices described herein (e.g. development device) that perform any of the processes, operations, or methods of the disclosure. Note that while the system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium or storage containing instructions which when executed by a system (or a processor), cause the system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The system 1200 may also include one or more input/output (I/O) components 1265 including mice, keyboards, touch screen, network interfaces, printers, speakers, and other devices. Typically, the input/ output components 1265 are coupled to the system through an input/output controller 1260.

Components/engines 1270 (or engines, components, units, or logic) may represent any of the tools are engines described above, such as, for example, memory debugging tool 120 (and related engines). Components/engines 1270 may reside, completely or at least partially, within the memories described above, or within a processor during execution thereof by the system. In addition, components/engines 1270 can be implemented as software, firmware, or functional circuitry within the system, or as combinations thereof.

In the foregoing, references to "one embodiment," "an embodiment," "embodiments" or "some embodiments," and the like mean that a particular feature, structure, or characteristic described in conjunction with the embodiment can be included in at least one embodiment. The appearances of these phrases in various places in the specification do not necessarily all refer to the same embodiment. The processes depicted in the figures herein are performed by processing logic that comprises hardware (e.g. circuitry, dedicated logic, etc.), software, or a combination of both. Although the processes are described in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    initiating a debugging procedure for a target application executing on a first device;
    identifying, at a breakpoint of the debugging procedure, one or more root objects in a memory associated with the target application;
    scanning the root objects to identify a set of objects in the memory that reference to, and are referenced by, the root objects;
    recursively scanning the set of objects to identify a chain of additional objects for the set that reference to, and are referenced by, at least one object of the set;
    creating an index mapping a direction of each of the identified references between the objects of the set; and
    displaying, on a graphical user interface and based on the index, a user selectable graph showing a directional reference path from each object of a first subset of the set to a first selected object.

2. The computer-implemented method of claim 1, wherein the directional reference path of the selected object not being traceable from one of the root objects indicates the selected object is potentially leaked or abandoned.

3. The computer-implemented method of claim 1, wherein the graph is displayed within a two-dimensional coordinate grid and each node corresponds to a set of coordinates, and wherein nodes are positioned without crossing references.

4. The computer-implemented method of claim 3, further comprising in response to a user selecting an object from the first subset, revealing, on the graph, the directional reference path from each object of a second subset of the set to the second selected object.

5. The computer-implemented method of claim 4, further comprising determining a length of a directional reference path within at least of portion of the second subset, and wherein the graph reserves units within the coordinate grid based on the determined length of the directional reference path.

6. The computer-implemented method of claim 1, wherein identifying the chain of additional objects for the set includes applying a set of hardcoded rules to the identified objects and annotating blocks of memory associated with the identified objects based on the hardcoded rules and a set of live variants of the identified objects.

7. The computer-implemented method of claim 1, further comprising refining the identified set of objects in the memory based on simulating processing of one or more objects of the set by a second operating system, wherein the second operating system is different than the operating system of the first device executing the target application.

8. The computer-implemented method of claim 7, wherein the refining includes serializing the one or more objects to a second device running the second operating system to perform the simulation.

9. A computer-implemented method, comprising:
    retrieving references between objects of a set of objects in one or more segments of memory;
    displaying a list of one or more objects of the set on a graphical user interface as selectable objects;
    in response to receiving a selection of one of the objects on the list, displaying, on the graphical user interface and based on the references retrieved, a graph showing a directional reference path from each object of an initial subset of the set to the selected object on the list; and
    in response to receiving a selection of an object shown on the graph, the graph revealing an additional directional reference path from each object of an additional subset of the set to the selected object shown on the graph.

10. The computer-implemented method of claim 9, wherein the retrieved references include multiple references between objects and the graph shows only a single directional reference path between objects, and the single directional reference path between objects is a shortest path between objects.

11. The computer-implemented method of claim 9, further comprising determining the initial subset of the set of objects based on relevancy criteria.

12. The computer-implemented method of claim 11, wherein the relevancy criteria includes at least one of a type of object, a size of object, a length of chain of additional objects, and a selected filter option.

13. The computer-implemented method of claim 9, wherein the graph is displayed within an invisible grid, and each object shown on the graph is positioned according to an assigned pair of coordinates on a grid.

14. The computer-implemented method of claim 13, wherein one dimension of the grid corresponds to a length of a longest directional reference path from the initial subset to the selected object.

15. The computer-implemented method of claim 14, wherein another dimension of the grid corresponds to a number of child references of the selected object on the list at a predetermined depth of the initial subset of objects.

16. The computer-implemented method of claim 13, wherein the grid reserves space along one dimension of the grid based on a length of a longest additional directional reference path within at least of portion of the additional subset, and a size of the grid does not change in response to the graph progressively displaying the additional directional reference path.

17. The computer-implemented method of claim 9, further comprising filtering the initial subset of the set of objects based on a set of filtering criteria, wherein the filtering criteria includes at least one a type of object and a size of object.

18. A non-transitory machine-readable medium storing instructions which, when executed by one or more processors of a system, cause the system to perform operations comprising:
   initiating a debugging procedure for a target application executing on a first device;
   identifying one or more root objects in a memory associated with the target application at a first and a second breakpoint of the debugging procedure;
   scanning the root objects to identify a set of objects in the memory that reference to, and are referenced by, the root objects at each breakpoint;
   recursively scanning the set of objects to identify a chain of additional objects for the set that reference to, and are referenced by, at least one object of the set at each breakpoint;
   creating a first and a second index mapping a direction of each of the identified references between the objects of the set for the first breakpoint and the second breakpoint respectively; and
   displaying, on a graphical user interface and based on the first index, a first user selectable graph showing a directional reference path from each object of an initial subset of the set to a selected object for the first breakpoint.

19. The medium of claim 18, further comprising displaying, on the graphical user interface and based on the second index, a second user selectable graph, simultaneously as the first user selectable graph, showing a directional reference path from each object of an initial subset of the set to the selected object for the second breakpoint.

20. A non-transitory machine-readable medium storing instructions which, when executed by one or more processors of a system, cause the system to perform operations comprising:
   retrieving, from one or more command-line tools, references between objects of a set of objects in one or more segments of memory;
   displaying a list of one or more objects of the set on a graphical user interface as selectable objects;
   in response to receiving a selection of one the objects on the list, displaying, on the graphical user interface and based on the references retrieved, a graph showing a directional reference path from each object of an initial subset of the set to the selected object on the list; and
   in response to receiving a selection of an object shown on the graph, the graph progressively displaying an additional directional reference path from each object of an additional subset of the set to the selected object shown on the graph, wherein each object shown on the graph is positioned according to an assigned pair of coordinates on a grid.

* * * * *